Aug. 10, 1965         C. G. RICHITELLI         3,199,541
INTERLOCKING STRIP FLEXIBLE HOSE
Filed April 3, 1963                          2 Sheets-Sheet 1

INVENTOR
Charles G. Richitelli
BY
ATTORNEYS

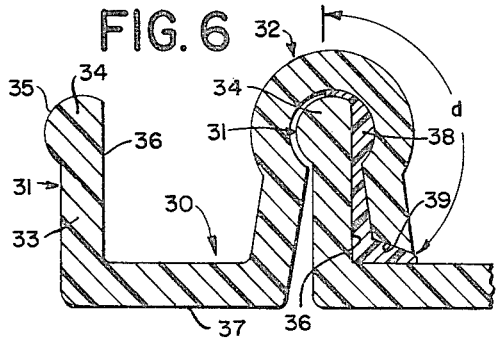
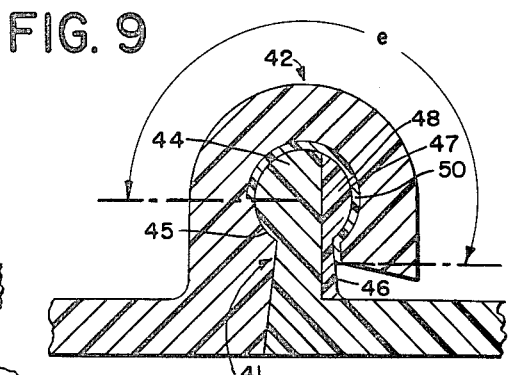
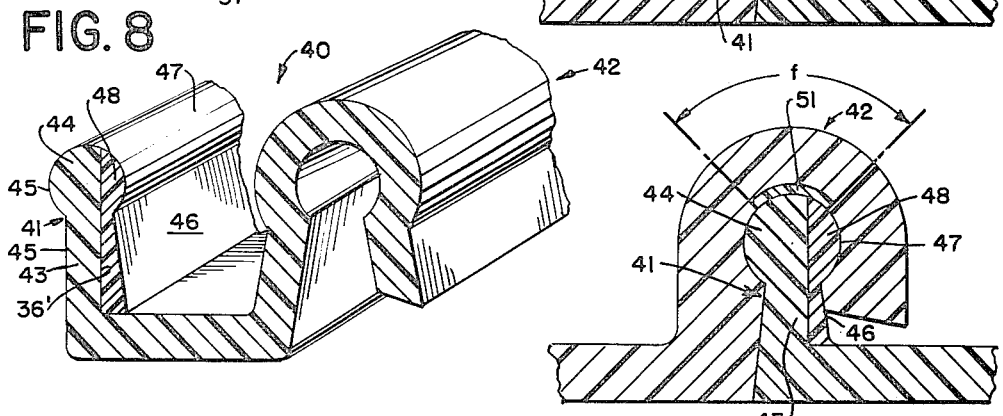
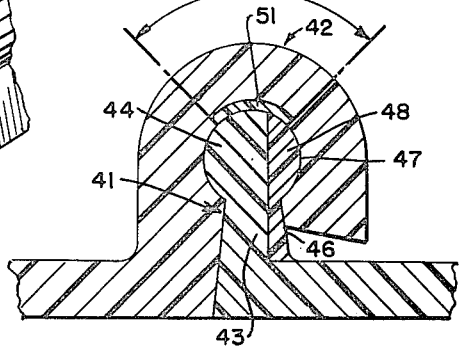
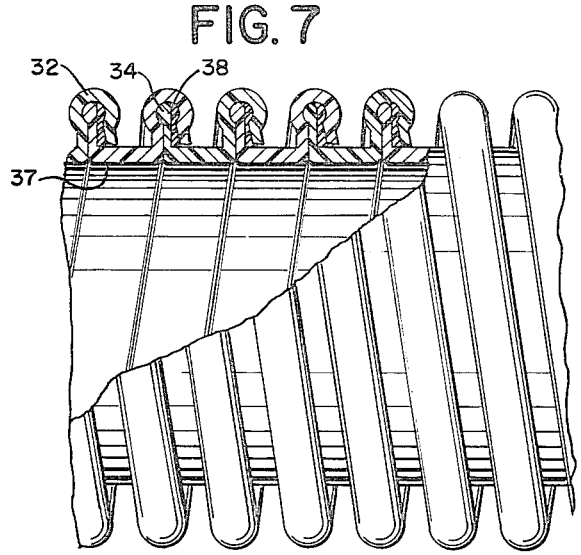
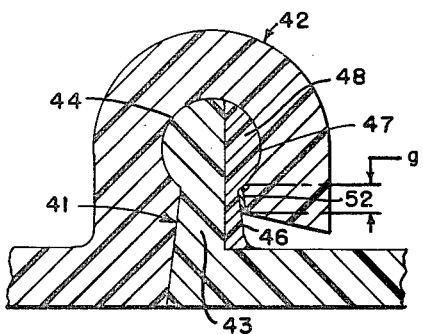
INVENTOR.
CHARLES G. RICHITELLI

United States Patent Office 3,199,541
Patented Aug. 10, 1965

3,199,541
INTERLOCKING STRIP FLEXIBLE HOSE
Charles G. Richitelli, Branford, Conn., assignor to Flexible Tubing Corporation, Guilford, Conn., a corporation of Connecticut
Filed Apr. 3, 1963, Ser. No. 270,465
9 Claims. (Cl. 138—129)

This is a continuation-in-part of application, Serial No. 177,846, filed March 6, 1962, now abandoned.

This invention relates to flexible hose formed from a helically arranged elongated strip in which adjacent convolutions are interlocked by opposed mating male and female connecting elements on the strip. More particularly it relates to a hose of the type described wherein at least one of the male and female connecting elements has a composite structural formation defined in part by the strip and in part by a resinous plastic material substantially stiffer than the strip material. It also relates to a joint arrangement for use in a hose of the type described wherein the male connecting element is affixed to at least part of the female connecting element.

Considerable attention has been given to the design of flexible hose made of interlocking convolutions of a helical strip. One of the more successful forms of such hose has been that in which resilient interconnecting male and female elements, usually tongues and grooves, are formed along opposite sides of an extruded plastic strip to snap releasably together. This design has the disadvantage, however, in that reliance merely upon the resilient interlock between the tongues and grooves of adjacent convolutions is not sufficient for many purposes to prevent leakage from the interior of the hose or distortion of the shape of the hose. Moreover, the known cross-sectional shapes for the interlocking-type strips used in these structures results in irregularities on the interior wall surface of the finished tube which increase resistance to fluid flow.

One of the primary purposes of this invention is to provide an improved interlocking strip wound flexible hose with a new structural foundation which contributes to the crush resistance of the hose while retaining its flexibility, and in its preferred embodiment leakage is effectively prevented through the cojoined convolutions even though interior pressures may be substantial. These advantages are achieved without a corresponding undesirable change in shape of the finished hose, and in which minimum fluid friction is created by the inside surface of the hose. In addition the method of manufacture need not be substantially altered and simple alterations to strip winding apparatus presently in use is all that is required to form tubes according to the invention.

Broadly stated, the invention is concerned with a flexible hose wherein at least one elongated strip is helically wound into tubular form and includes male and female connecting elements formed on the respective marginal portions of the strip. One marginal portion of the strip overlaps the adjacent marginal portion of an adjoining convolution to interlock the male and female connecting elements. The improvement is characterized in that at least one of said male and female elements has a composite structural formation defined in part by said strip and in part by a resinous plastic material substantially stiffer than the strip material to provide a stiff reinforcing element within the resulting helical joint formed between adjacent convolutions. Particularly the invention contemplates a male connecting element having a composite structural formation defined in part by strip and in part by a resinous plastic material substantially stiffer than the strip material. The plastic material is bonded to the strip part of the male element and is bonded to the female element of an adjoining convolution. In its more specific form, the new hose includes mating tongue and groove portions disposed on opposite longitudinal sides of the strip, and the improvement comprises a continuous elongated deposit of plastic material integrally affixing part of the tongue portion to part of its interlocked groove portion.

By this construction, the shape of the finished hose was measured to have an increase in crush resistance and a corresponding ability to resist negative pressure during service. Also by bonding the connecting elements, the shape of the finished hose cannot be distorted by torsional stresses which otherwise would cause sliding displacement between the male and female connecting elements. This difficulty, inherent in known designs of interlocking strip flexible hose, is entirely prevented by the bonding means securing at least part of the male connecting element to its associated female connecting element. The bonding supplements that resilient interlocking effect between the convolutions which substantially resists most forces except those tending to cause the male and female elements to slide relative to each other. Preferably, the male elements is defined in part by a resinous plastic material which not only is substantially stiffer than the strip material, but also is bonded to the female element to provide an effective leak-proof barrier even when the fluid is pressurized.

The invention further provides a flexible hose of the type having a male element being a tongue formed by a flange extending from the strip and a bead along the outer edge of the flange, and the female element is defined by a groove formed with a cross section conformable to at least part of both side surfaces of said flange and all of the surface of said bead. The improvement here resides in that the tongue has a composite structural formation defined in part by the strip with a substantial portion of the flange and the bead nearest the outermost edge of the associated interlocked groove portion defined by a resinous plastic material substantially stiffer than the strip material. The plastic mateiral may be fused within the groove or bonding means may be deposited at certain selected cross-sectional regions between the male and female connecting means to achieve various combinations of flexibility and sealing.

These and other features of the new hose are set forth in the following description of a preferred embodiment of the invention having reference to the accompanying drawing, wherein FIG. 1 is a perspective fragmentary view of a length of the strip which forms the new hose;

FIG. 6 is an enlarged cross section taken through adjoining interlocked convolutions and a full width of a strip and illustrating the composite structures and bonding;

FIG. 7 is a fragmentary elevation partly in section of the finished form of the hose with a composite structure male element;

FIG. 8 is an enlarged fragmentary perspective showing a strip having a male element with a pre-formed composite structure;

FIG. 9 is an enlarged cross section taken through adjoining interlocked convolutions and illustrating the type of bonding deposit in exaggerated dimensions which affords a maximum sealing effect;

FIG. 10 is an enlarged view similar to FIG. 9 showing the type of bonding deposit in exaggerated dimensions designed for optimum flexibility and sealing; and FIG. 11 is a view similar to FIGS. 2 and 3 showing the type of bonding deposit in exaggerated dimensions designed for maximum flexibility.

Figure 1:
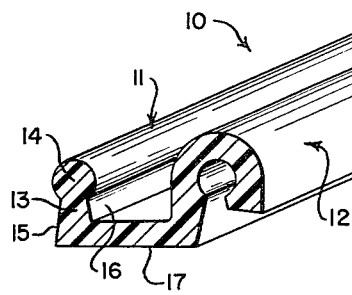

Referring first to FIG. 1, a strip 10 is shown which is extruded from a resilient yet self-supporting plastic material. Polyethylene is particularly suited for a wide range of uses of the new hose; or the strip 10 may be of polypropylene, a vinyl, nylon, or other thermoplastic as desired. The strip 10 includes a tongue portion 11 and a groove portion 12 disposed in opposite directions perpendicular to the general plane of the strip and on opposite longitudinal sides or marginal portions thereof. The tongue portion 11 includes a flange 13 with a bead 14 along the outer edge thereof; the bead 14 is of generally circular cross section. As shown more clearly in FIGS. 2–4, the flange 13 includes an outer side surface 15 and an inner side surface 16. The groove portion 12 is formed with a cross section conforming to all of the outer side surface 15 of the flange 13, part of the inner side surface 16 of the flange 13, and all of the surface of the bead 14. The face 17 of the strip 10 opposite the tongue and groove portion is flat so that it defines a uniformly cylindrical inside circumference of the hose when the strip is helically arranged in tubular form.

Figure 5:
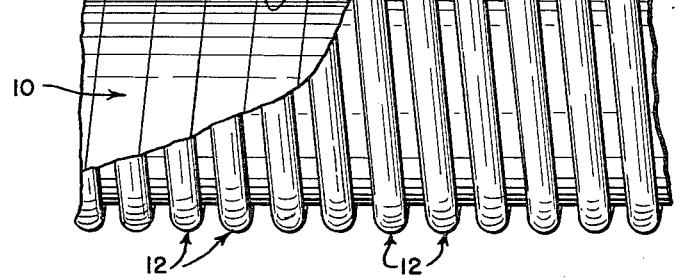
FIG. 5 is a fragmentary elevation partly in section of the finished form of the new hose.

In forming the hose, the strip 10 is wrapped helically about a mandrel with its face 17 in contact with the mandrel. As each convolution is applied, the groove portion 12 is snapped resiliently over the tongue portion 11 of the prior convolution to form a tubular structure as shown in FIG. 5. The uniform cylindrical shape of the inside circumference of the hose, defined by the flat face 17 of the strip 10, is apparent from FIG. 5. If desired, a continuous elongated bore may be formed axially through the center of the bead 14 and reinforcing wire may be inserted through that bore. This results in a somewhat firmer interlock between the tongue portion 11 and the groove portion 12. It is also possible in forming hose of relatively large diameter to lay two or more of the strips helically about a mandrel with their edges interlocking as described, much in the manner of a multiple lead screw thread.

As the strip 10 is applied helically around the mandrel, a small continuous deposit of bonding material is applied at certain selected regions along either the tongue portion 11 or within the groove portion 12. This bonding material is preferably elastomeric and advantageously is of the same thermoplastic material as the strip 10. Thus, in this example of the new structure, the deposit of bonding material is of polyethylene, applied in place while in the uncured state and allowed to set only after the tongue and groove have been snapped together at each convolution. A bond of this sort forms a continuous elongated film-like deposit integrally affixing part of the tongue portion 11 to part of its interlocked groove portion 12. The deposit conforms in shape substantially to that of the interface between those parts of the tongue and groove portions.

Figure 2:
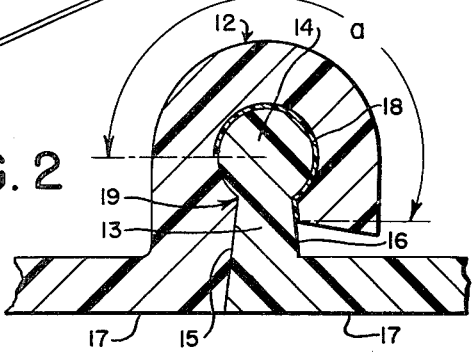
FIG. 2 is an enlarged cross section taken through adjoining interlocked convolutions of the hose and illustrating the type of bonding deposit in exaggerated dimensions which affords a maximum sealing effect.

Referring now to FIG. 2, one form of a deposit 18 of bonding material is shown which provides maximum sealing between the interlocked convolutions, though with somewhat less flexibility than in the other forms described below. Here, the uncured polyethylene is applied continuously along the bead 14 of the flange portion 11 in an amount and at a location such that when the groove portion 12 is snapped over the tongue portion 11 the polyethylene spreads laterally around part of the tongue portion. The lateral extent of this spread deposit relative to the strip is confined in cross section to a region along the inner side 16 of the flange nearest the outermost edge of the associated interlocked groove portion and continuously along a major arcuate portion of the bead surface and terminates spaced from the juncture of the bead and the outer side 15 of the flange. Thus it is preferable that the deposit does not extend entirely to the juncture 19 but rather is limited to the area indicated by the arc $a$ appearing in FIG. 2. This type of bond is especially adapted to flexible hose used in vacuum cleaners for swimming pools. Such a hose must float, which is why polyethylene or polypropylene is suitable, and yet must be impervious to leakage when subjected to high internal and external pressure. Since flexibility is not critically important in this application of the new hose, the advantages of a wide sealing area as shown in FIG. 2 are quite beneficial even though the minimum bend radius is somewhat increased.

Figure 3:
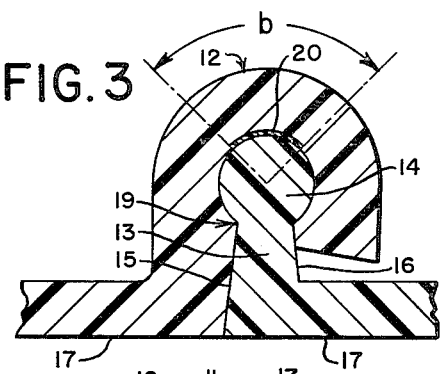
FIG. 3 is a view similar to FIG. 2 showing the type of bonding deposit in exaggerated dimensions designed for optimum flexibility and sealing.

In FIG. 3, a bonding material deposit 20 is shown which achieves a combination of good flexibility and sealing. Here, the material is deposited in a small amount along the crest of the bead 14 of the tongue portion 11 so that when the tongue is snapped into the groove portion 12, the lateral extension of the deposit is confined principally to the arcuate portion of the bead surface remote from the flange 13. Preferably, the deposit is kept within that range in the uppermost ninety degrees of the top of the bead 14 as shown by the arc $b$ in FIG. 3. This form provides optimum flexibility plus sealing effect.

Figure 4:
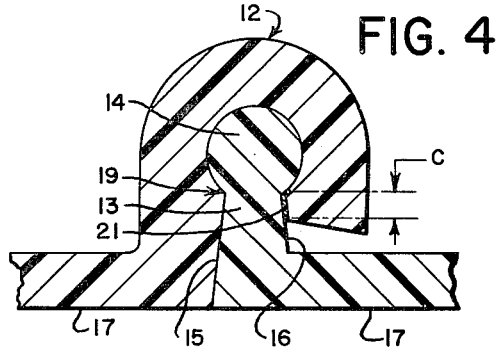
FIG. 4 is a view similar to FIGS. 2 and 3 showing the type of bonding deposit in exaggerated dimensions designed for maximum flexibility.

In FIG. 4, a deposit 21 is confined to a region extending from the inner side 16 of the flange 13 nearest the outermost edge of the associated interlocked groove portion 12 to juncture 22 between the inner side 16 of the flange and the bead. Again, it is advantageous to restrict the spread of the deposit of bonding material to a small initial portion of that quarter of the bead surface as shown by $c$ in FIG. 4. This form is particularly suitable when the hose is used for home vacuum cleaners and the like, since it is then subjected to minimum external forces and requires maximum flexibility.

The hose of the embodiment shown in FIGS. 1–5 is made of strip which may be extruded continuously and applied about a mandrel to form indefinite tubular lengths in which the interlock between the tongue and groove portions resists axial tension and radial force. A joint arrangement for use in such hoses is provided in which the critical bonding means between the tongue and groove portions provides an effective seal against leakage, and yet permits considerable flexibility in the finished hose. More importantly, it prevents distortion by torsional forces which otherwise would cause some sections of the hose to bind into small diameter and others to expand into abnormally large diameter. The deposit of bonding material entirely prevents such sliding movement between the interlocked tongue and groove, and thus insures that the finished hose will retain its desired shape. Because of the flat face 17 on the strip, the inside circumference of the new hose is uniformly cylindrical throughout, as shown in FIG. 5, and presents minimal fluid friction to flow.

Referring now to FIGS. 6 and 7, a second embodiment of the invention is shown. A strip 30 is extruded from a similar material described above. Here the strip 30 also includes a tongue portion 31 and a groove portion 32 disposed in opposite directions perpendicular to the general plane of the strip and on opposite longitudinal sides or marginal portions thereof. The tongue portion 31 differs from the tongue portion 11 described above in that it has a flange 33 of smaller cross-sectional thickness than the flange 13 and has a bead 34 having an arcuate surface 35 formed on the tongue 31 on the side thereof facing away from the groove portion 32. A substantially flat surface 36 defines the side of the tongue portion 31 which faces toward the groove portion 32 thus defining the inner side surface of the tongue portion to provide a composite structure tongue. The face 37 of the strip 30 opposite the tongue and groove portion is flat so that it defines a uniformly cylindrical circumference of the hose when the strip is helically arranged in tubular form.

In forming the hose, the strip 30 is wrapped helically about a mandrel with its face 37 in contact with the mandrel. As described above in the ordinary manner for forming interlocked strip-wound hoses, as each convolution is applied to the mandrel, the groove portion is snapped resiliently over the tongue portion 31 of the prior convolution to form a tubular structure as shown in FIG. 7. Here, however, just prior to the interlocking of the tongue and groove portion an appreciable amount of reinforcing material 38 is deposited on the tongue portion 31 generally along the inner side surface 36. As the groove portion 32, which has a cross section similar to that described above in respect to groove portion 12, is snapped resiliently over the tongue portion 31 with the deposit of the reinforcing material 38 thereon, the reinforcing material becomes positioned between the tongue portion 31 and the groove portion 32 and between the inner side 36 of the tongue portion and the outermost edge of the associated interlock groove portion. Because of the resilient interlock between the tongue and groove portion, the reinforcing material is forced laterally to a slight degree along the arcuate surface 35 overlying the bead 34 and also outwardly at the lower edge 39 of the outermost edge of the associated interlock groove portion. The major portion of the reinforcing material 38 becomes fused to the tongue portion 31 and the groove portion 32 acting somewhat like a die forms a composite structure between the tongue portion and the reinforcing material which generally takes the shape of the tongue portion 11 described above. When the interlocked tube is formed in the manner just described, the reinforcing material 38 also becomes fused to the groove portion 32 and thereby not only provides a reinforcement within the joint but also provides an adhesive seal. The range of the reinforcing material 38 is shown by the arc $d$ in FIG. 6. The reinforcing material 38 has stiffer properties than the material from which the joint strip is formed, and thus a helical reinforcing element is provided throughout the length of the hose.

In one test a two inch I.D. hose had added to it in the manner described above, sealing and reinforcing materials consisting of polyethylene or polyethylene co-polymers. These materials were chosen because of their chemical similarity with the strip material, thereby permitting a true fusion between the strip and reinforcing material. After forming the tubes, they were tested for crush resistance in a Dillon Universal Tester and the results set forth in the following table were attained.

| Reinforcing Material | Density | Melt Index | Stiffness Value (p.s.i.) | Hose Weight, gm./ft. | Crush Resistance, lb./6" | Percent Change |
|---|---|---|---|---|---|---|
| None | | | | 161 | 150 | |
| Ethylene co-polymer | 0.931 | 6 | 4,500 | 189 | 185 | Control |
| Low-density polyethylene | 0.919 | 2 | 20,000 | 178 | 180 | −2.8 |
| High-density co-polymer | 0.95 | 4 | 115,000 | 187 | 240 | +29.8 |
| High-density polyethylene | 0.96 | 5 | 150,000 | 189 | 220 | +19.5 |

By using the ethylene co-polymer reinforcing material as the norm for determining an increase or decrease in crush resistance, it was noted that owing to the high stiffness value and good flow properties of the high density co-polymers, the hose crush resistance is increased approximately 29 percent over the highest result obtained with the ethylene copolymer.

In FIG. 8 a joint strip 40 is shown which includes a tongue portion 41, a groove portion 42 disposed in opposite direction perpendicular to the general plane of the strip and on longitudinal sides or on marginal portion thereof. The tongue portion 41 includes a flange 43 with a bead 44 along the outer edge thereof. The bead 44 is of generally circular cross section. The flange 43 includes an outer side surface 45 and an inner side surface 46. The groove portion 42 is formed with a cross section conforming to all of the outer surface 45 of the strip 43, part of the inner side surface 46 of the strip 43, and all of the surface of the bead 44. Here, the arcuate portion 47 of the bead 44 and substantially all of the inner side surface 46 of the flange 43 is defined by a reinforcing material 48 which is substantially stiffer than the material from which the strip 40 is formed. It is proposed that the strip 40 can be originally formed with a cross section similar to that as described in relation to the strip 30. An extruded cross section of reinforcing material 48 with its arcuate portion 47 and its generally flat inner side surface 46 would then be brought in contact with the inner tongue side surface 36′, immediately after being extruded so that it would fuse to the reinforcing extruded material to the tongue side surface 36′.

Once the strip 40 has been formed in this manner, it can subsequently be formed into the hose in the ordinary manner by interlocking the tongue and groove portions. Owing to the inclusion of the reinforcing cross section 48 in this composite structure however, a stiff reinforcing element will be provided helically throughout the length of the hose.

Optionally, the composite structure tongue portion 41 can be interlocked into the groove portion 42 by use of adhesives as shown in FIGS. 9 to 11. In FIG. 9 a deposit 50 of bonding material is applied in a manner similar to that described in relation to FIG. 2. Here, polyethylene is applied continuously along the bead 44 of the tongue portion 41 in an amount and at a location such that when the groove portion 42 is snapped over the tongue portion 41, the polyethylene slides laterally around part of the tongue portion. The lateral extent of this deposit relative to the strip is confined in cross section to a region along the inner side 46 of the flange nearest the outermost edge of the associated interlocked groove portion and continuously along a major arcuate portion of the bead surface and terminates spaced from the juncture of the bead and the outer side 45 of the flange. The deposit is confined within that range as shown by arc $e$.

In FIG. 10 a bonding material deposit 51 is applied in a similar manner as that described in FIG. 3. Here, the material is deposited in a small amount along the crest of the bead 44 of the tongue portion 41 so that when the tongue is snapped into the groove portion 42, the lateral extension of the deposit is confined principally to the arcuate portion of the bead surface remote from the flange 43. Preferably, the deposit is confined within that range in the uppermost ninety degrees at the top of the bead 44, as shown by the arc $f$.

In FIG. 11 a deposit 52 is applied in a similar manner to that as described in FIG. 4. Here, the deposit is confined to a region extending from the inner side 46 of the flange 43 nearest the outermost edge of the associated interlocked groove portion 42 to the juncture between the inner side 46 of the flange and the bead. As noted above, it is advantageous to restrict the spread of the deposit of the bonding material to the small initial portion of that quarter of the bead's surface as shown by $g$ in FIG. 11.

The hose described in relation to FIGS. 9 to 11 combines all the advantages of increased crushed resistance by incorporating within the composite structure of the tongue portion 41 a reinforcing material 48 with substantially greater stiffness than that of the material itself. Also by selectively depositing the bonding material so as to adhesively seal the groove portion to the tongue portion, the various degrees of resilience of the interlocked hose realized in relation to FIGS. 2 to 4 can also be obtained in a reinforced flexible hose as well.

I claim:

1. In a flexible hose wherein at least one elongated strip is helically wound into tubular form, including male and female connecting elements formed on the respective marginal portions of said strip, and one marginal portion of said strip overlapping the adjacent marginal portion of an adjoining convolution to interlock the male and female connecting elements, the improvement comprising at least one of said male and female elements having a composite structural formation defined in part by said strip and in part by a resinous plastic material substantially stiffer than the strip material to provide a stiff reinforcing element within the resulting helical joint formed between adjacent convolutions.

2. In a flexible hose wherein at least one elongated strip is helically wound into tubular form, including male and female connecting elements formed on the respective marginal portions of said strip, and one marginal portion of said strip overlapping the adjacent marginal portion of an adjoining convolution to interlock the male and female connecting elements, the improvement comprising said male element having a composite structural formation defined in part by said strip and in part by a resinous plastic material substantially stiffer than the strip material to provide a stiff reinforcing element within the resulting helical joint formed between adjacent convolutions.

3. In a flexible hose wherein at least one elongated strip is helically wound into tubular form, including male and female connecting elements formed on the respective marginal portions of the strip, and one marginal portion of said strip overlapping the adjacent marginal portion of an adjoining convolution to interlock the male and female connecting elements, the improvement comprising at least one of said male and female elements having a composite structural formation defined in part by said strip and in part by a resinous plastic material substantially stiffer than the strip material, said plastic material bonded to said strip part of the one connecting element and bonded to the connecting element of the adjoining convolution to provide a stiff reinforcing element within the resulting bonded helical joint formed between adjacent convolutions.

4. In a flexible hose werein at least one elongated strip is helically wound into tubular form, including male and female connecting elements formed on the respective marginal portions of the strip, and one marginal portion of said strip overlapping the adjacent marginal portion of an adjoining convolution to interlock the male and female connecting elements, the improvement comprising said male connecting element having a composite structural formation defined in part by said strip and in part by a resinous plastic material substantially stiffer than the strip material, said plastic material bonded to said strip part of the male element and bonded to the female element of an adjoining convolution to provide a stiff reinforcing element within the resulting bonded helical joint formed between adjacent convolutions.

5. In a flexible hose werein at least one elongated strip is helically wound into tubular form, including male and female connecting elements formed on the respective marginal portions of the strip, one marginal portion of said strip overlapping the adjacent marginal portion of an adjoining convolution to interlock the male and female connecting elements, said male element being a tongue formed by a fllange and a bead along the outer edge of said flange, and said female element being formed of a groove formed with a cross section conformable to at least part of both side surfaces of said flange and all of the surface of said bead, the improvement comprising said tongue having a composite structural formation defined in part by said strip with a substantial portion of said flange and said bead nearest the outermost edge of the associated interlocked groove portion defined by a resinous plastic material substantially stiffer than the strip material to provide a stiff reinforcing element within the resulting helical joint formed between adjacent convolutions.

6. A flexible hose according to claim 5 wherein said tongue has a composite structural formation defined in part by said strip with a substantial portion of said flange and said bead defined by a resinous plastic material substantially stiffer than the strip material, said plastic material fused to said male element and to said female element along the portion of said groove adjacent the side surface of the flange and the portion of the bead defined by said plastic material.

7. A flexible hose according to claim 5 werein an elongated integral bonding means is provided to affix said tongue to said groove, and the lateral extension of said bonding means relative to said strip is confined in cross section principally to the arcuate portion of the bead surface remote from the flange.

8. A flexible hose according to claim 5 werein an elongated integral bonding means is provided to affix said tongue to said bonding means, and the lateral extension of said bonding means relative to said strip is confined in cross section principally to a region along that side of the flange nearest the outermost edge of the associated interlocked groove portion.

9. A flexible hose according to claim 5 werein an elongated integral bonding means is provided to affix said tongue to said bonding means, and the lateral extension of said bonding means relative to said strip is confined in cross section to a region along that side of the flange nearest the outermost edge of the associated interlocked groove portion and continuously along a major arcuate portion of the bead surface.

References Cited by the Examiner

UNITED STATES PATENTS

| 1,133,070 | 3/15 | Subers | 138—135 |
| 2,739,089 | 3/56 | Hageltorn | 138—129 XR |
| 2,901,029 | 8/59 | Marsden | 138—122 XR |

FOREIGN PATENTS

| 751,621 | 5/53 | Germany. |
| 789,521 | 1/58 | Great Britain. |

LEWIS J. LENNY, *Primary Examiner.*